United States Patent
Müller et al.

(10) Patent No.: US 12,179,542 B2
(45) Date of Patent: Dec. 31, 2024

(54) DAMPING ARRANGEMENT FOR AN AXLE OF A MOTOR VEHICLE AND MOTOR VEHICLE

(71) Applicants: Dr. Ing. h.c. F. Porsche Aktiengesellschaft, Stuttgart (DE); Silver Atena GmbH, Munich (DE)

(72) Inventors: Phillip Müller, Stuttgart (DE); Martin Klepatsch, Fürstenfeldbruck (DE)

(73) Assignees: Dr. Ing. h.c. F. Porsche Aktiengesellschaft (DE); Silver Atena GmbH (DE)

( * ) Notice: Subject to any disclaimer, the term of this patent is extended or adjusted under 35 U.S.C. 154(b) by 0 days.

(21) Appl. No.: 18/623,245

(22) Filed: Apr. 1, 2024

(65) Prior Publication Data
US 2024/0336105 A1 Oct. 10, 2024

(30) Foreign Application Priority Data
Apr. 4, 2023 (DE) .......................... 102023108591.3

(51) Int. Cl.
*B60G 17/08* (2006.01)
*B60G 17/018* (2006.01)

(52) U.S. Cl.
CPC .......... *B60G 17/08* (2013.01); *B60G 17/018* (2013.01); *B60G 2202/24* (2013.01); *B60G 2202/422* (2013.01); *B60G 2600/73* (2013.01)

(58) Field of Classification Search
CPC .. B60G 17/08; B60G 17/018; B60G 2202/24; B60G 2202/422; B60G 2600/73
See application file for complete search history.

(56) References Cited

U.S. PATENT DOCUMENTS 3,681,671 A 8/1972 Elliott
11,554,625 B2 * 1/2023 Kemnitz .................. H02K 5/04
(Continued)

FOREIGN PATENT DOCUMENTS

DE 10314251 A1 10/2004
DE 102019118384 A1 1/2021
DE 102017117658 B4 6/2021
(Continued)

*Primary Examiner* — Jason D Shanske
*Assistant Examiner* — Matthew James O'Neill
(74) *Attorney, Agent, or Firm* — Buchanan Ingersoll & Rooney PC

(57) ABSTRACT

Damping arrangement for an axle of an active chassis of a motor vehicle. A damping system interacts with each wheel of the axle. Each of the damping systems includes the following assemblies: a damper including a double-acting hydraulic cylinder and a piston, a hydraulic pump and an electric motor for driving same, and a hydraulic unit which includes a hydraulic reservoir and valves. The hydraulic pump and the hydraulic unit of the respective damping system interact with hydraulic chambers of the hydraulic cylinder in such a manner that a movement of the piston in a first or in a second operating direction can be provided depending on the delivery direction of the hydraulic pump. The electric motors of both damping systems are connected to a common control device and can be actuated thereby, wherein the common control device has electronic assemblies which are distributed on different printed circuit boards.

10 Claims, 2 Drawing Sheets

(56) References Cited

U.S. PATENT DOCUMENTS

2006/0038370 A1* 2/2006 Doerr ................... B60G 17/056
                                                    280/5.506
2023/0093936 A1* 3/2023 Konada ................ B60G 17/018
                                                    701/37

FOREIGN PATENT DOCUMENTS

DE    102019115492 B4    8/2022
EP          1980426 B1    4/2017

\* cited by examiner

DAMPING ARRANGEMENT FOR AN AXLE OF A MOTOR VEHICLE AND MOTOR VEHICLE

CROSS-REFERENCE TO RELATED APPLICATION

This application claims priority to German Patent Application No. 10 2023 108 591.3, filed Apr. 4, 2023, the content of such application being incorporated by reference herein in its entirety.

FIELD OF THE INVENTION

The invention relates to a damping arrangement for an axle of an active chassis of a motor vehicle and to a motor vehicle.

BACKGROUND OF THE INVENTION

DE 10 2017 117 658 B4 and DE 10 2019 115 492 B4, which are incorporated by reference herein, each disclose a damping system for a wheel of a motor vehicle, which comprises a damper, a hydraulic pump driven by an electric motor, a hydraulic reservoir and several valves. The damper is formed by a double-acting hydraulic cylinder and a piston that can move back and forth therein. The hydraulic pump is coupled via hydraulic lines to hydraulic chambers of the hydraulic piston, wherein a movement of the piston in a first operating direction or in a second operating direction can be provided depending on the delivery direction of the hydraulic pump. Two such damping systems are assigned to an axle which has two wheels. The electric motors of the damping systems are actuated by a control device, where it has been customary until now that each damping system has an individual control device.

DE 10 2019 118 384 A1, which is incorporated by reference herein, discloses a device for providing hydraulic energy in a chassis system comprising a first hydraulic pump, a first electric motor for driving same, a second hydraulic pump, a second electric motor for driving same, and a common electronic unit. Said common electronic unit is set up to actuate the first and second electric motors and thus operate the two hydraulic pumps.

DE 103 14 251 A1, which is incorporated by reference herein, discloses a chassis regulation system. EP 1 980 426 B1, which is incorporated by reference herein, discloses an electronic suspension system and thus an active chassis of a motor vehicle. U.S. Pat. No. 3,681,671 A1, which is incorporated by reference herein, discloses another active chassis of a motor vehicle.

SUMMARY OF THE INVENTION

Described herein is a damping arrangement for an axle of an active chassis, which has a simple, compact structure and enables reliable actuation of the electric motors which are used to drive the hydraulic pumps. In addition, a motor vehicle having such a damping arrangement is to be provided.

In the damping arrangement according to aspects of the invention, the electric motors of both damping systems are connected to a common control device and can be actuated by the common control device.

In the damping arrangement according to aspects of the invention, the common control device has electronic assemblies which are distributed on different printed circuit boards.

A first printed circuit board has a low-voltage range with low-voltage assemblies and a high-voltage range with high-voltage assemblies which is galvanically isolated from the low-voltage range by means of isolating assemblies, wherein a CPU is included in the high-voltage assemblies. A second printed circuit board has exclusively high-voltage assemblies, wherein the second printed circuit board is electrically connected to the high-voltage range of the first printed circuit board.

In the damping arrangement according to aspects of the invention, a common control device is provided for both damping systems and therefore for the electric motors of both damping systems. Electronic assemblies of this control device are distributed on a first and a second printed circuit board, wherein the first printed circuit board has a low-voltage range and a high-voltage range, the assemblies of which are galvanically isolated by isolating assemblies. The CPU is part of the high-voltage range of the first printed circuit board, which is electrically connected to the second printed circuit board.

With a simple, compact design of the control device and the damping arrangement, reliable actuation of the electric motors of both damping systems using electric current is possible.

The low-voltage assemblies of the low-voltage range of the first printed circuit board preferably have a low-voltage connection, a low-voltage voltage distributor and a signal converter. The isolating assemblies of the galvanic isolation of the first printed circuit board have a transformer assembly and a digital isolator. In addition to the CPU, the high-voltage assemblies of the high-voltage range of the first printed circuit board have a control logic system for DC/AC converters, wherein the DC/AC converters which are used to provide an electric current for the electric machines are high-voltage assemblies of the second printed circuit board. The second printed circuit board preferably has a high-voltage connection and a DC link capacitor connected between the high-voltage connection and the DC/AC converters as additional high-voltage assemblies. This distribution of the electronic assemblies on the two printed circuit boards and the high-voltage range as well as the low-voltage range of the first printed circuit board is particularly preferred in order to ensure reliable actuation of the electric motors in the case of a simple, compact design.

The operating voltage of the low-voltage assemblies is less than 50 volts, preferably less than 25 volts, particularly preferably less than 15 volts. The operating voltage of the high-voltage assemblies is greater than 200 V, preferably greater than 400 volts, particularly preferably greater than 500 volts. The galvanic isolation preferably provides isolation of up to 2500 volts.

BRIEF DESCRIPTION OF THE DRAWINGS

Preferred developments of the invention result from the dependent claims and the following description. Exemplary embodiments of the invention are explained in more detail on the basis of the drawing, but are not restricted thereto. In the drawing:

DETAILED DESCRIPTION OF THE INVENTION

Figure 1:
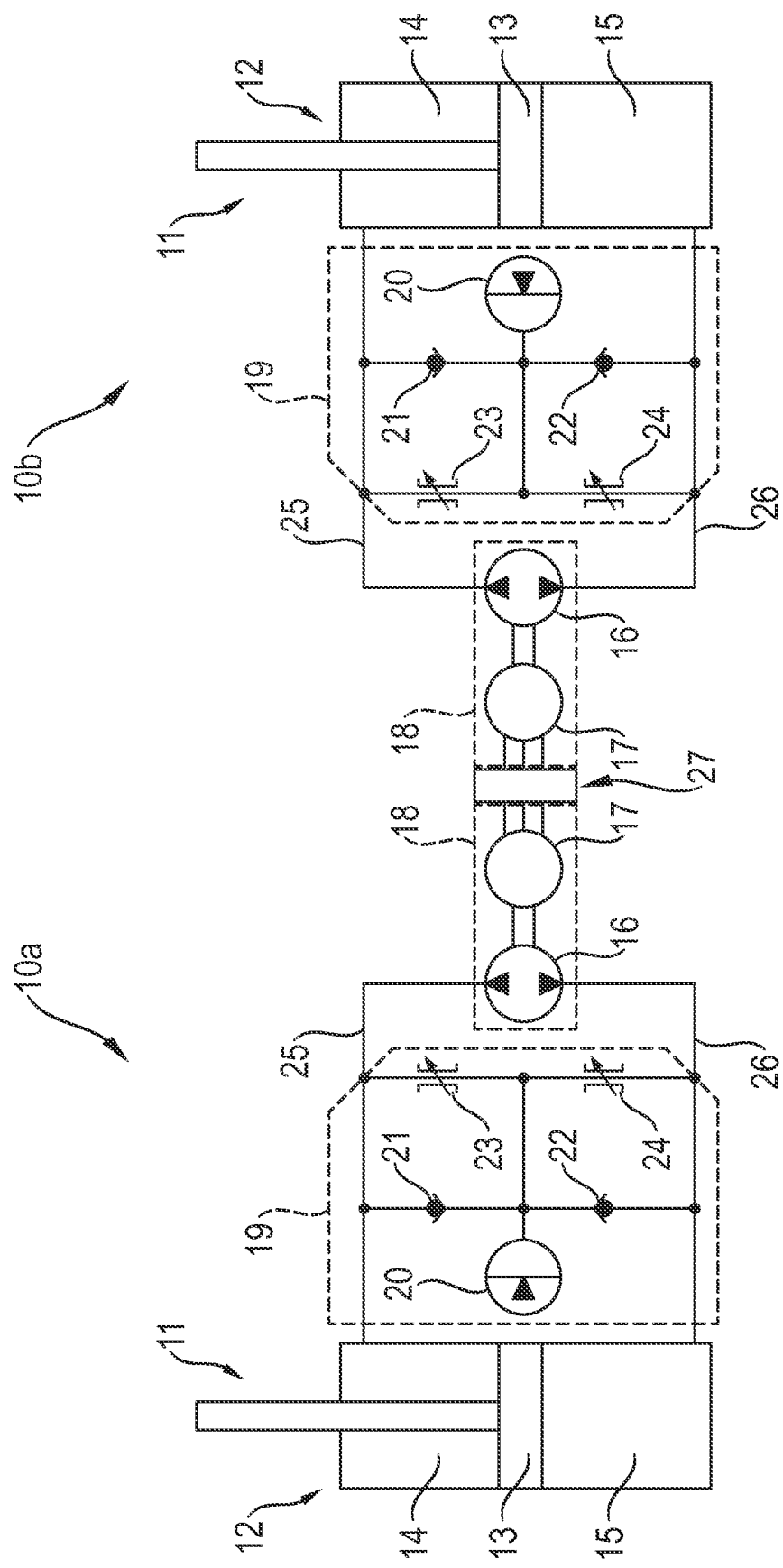
FIG. 1 shows a schematic illustration of a damping arrangement according to aspects of the invention for the wheels of an axle of a motor vehicle according to aspects of the invention.

FIG. 1 shows in highly schematic fashion a damping arrangement according to aspects of the invention for two wheels of an axle of an active chassis of a motor vehicle. The damping arrangement of the active chassis has one damping system 10a, 10b for each wheel.

Each of the damping systems 10a, 10b has a damper 11 which can be coupled to a wheel suspension system, which is not shown, for the respective wheel, which is not shown. The respective damper 11 is formed by a double-acting hydraulic cylinder 12 and a piston 13, wherein the piston 13 in the hydraulic cylinder 12 can be moved back and forth, specifically in FIG. 1 upwards and downwards.

The hydraulic cylinder 12, which is designed as a double-acting hydraulic cylinder, of each of the damping systems 10a, 10b has a hydraulic chamber 14, 15 on each side of the piston 13. Depending on which of the two hydraulic chambers 14, 15 is supplied with hydraulic oil and from which of the two hydraulic chambers 15, 14 hydraulic oil is discharged, the piston 13 can be displaced either in a first operating direction or in an opposite second operating direction. The first operating direction of the piston 13 is an operation in the rebound direction and the second operating direction of the piston 13 is an operation in the compression direction.

The respective damping system 10a, 10b also has a hydraulic pump 16 which can be driven by a respective electric motor 17. The hydraulic pump 16 and electric motor 17 form a respective pump-motor unit 18.

The hydraulic pump 16 is a reversing pump which can be driven in different directions of rotation by the respective electric motor 17 in order to provide different delivery directions.

The respective damping system 10a, 10b of FIG. 1 also has a hydraulic unit 19 which has a hydraulic reservoir 20 and valves 21, 22, 23, 24. The valves 21, 22 are check valves and the valves 23, 24 are damping valves. The hydraulic reservoir 20 of each of the damping systems 10a, 10b engages between the check valves 21, 22 and between the damping valves 23, 24 on hydraulic lines of the hydraulic unit 19, said hydraulic lines being coupled to the hydraulic chambers 14, 15. Depending on the delivery direction of the hydraulic pump 16 and preferably also depending on the position of the valves 21, 22, 23, 24 of the respective damping system, in order to displace the piston 13 oil is supplied to the hydraulic chamber 14 in the first direction of movement, that is to say in the rebound direction, and oil is discharged from the hydraulic chamber 15, or in order to provide a second direction of movement of the piston 13 in the second direction of movement, that is to say in the compression direction, oil is supplied to the hydraulic chamber 15 and discharged from the hydraulic chamber 14.

The hydraulic pump 16 of the pump-motor unit 18 of the respective damping system 10a, 10b is connected via hydraulic lines 25, 26 to the hydraulic unit 19 which comprises the hydraulic reservoir 20 and the valves 21, 22, 23, 24 and which is preferably installed as a unit on the damper 12 or on the hydraulic cylinder 13.

Figure 2:
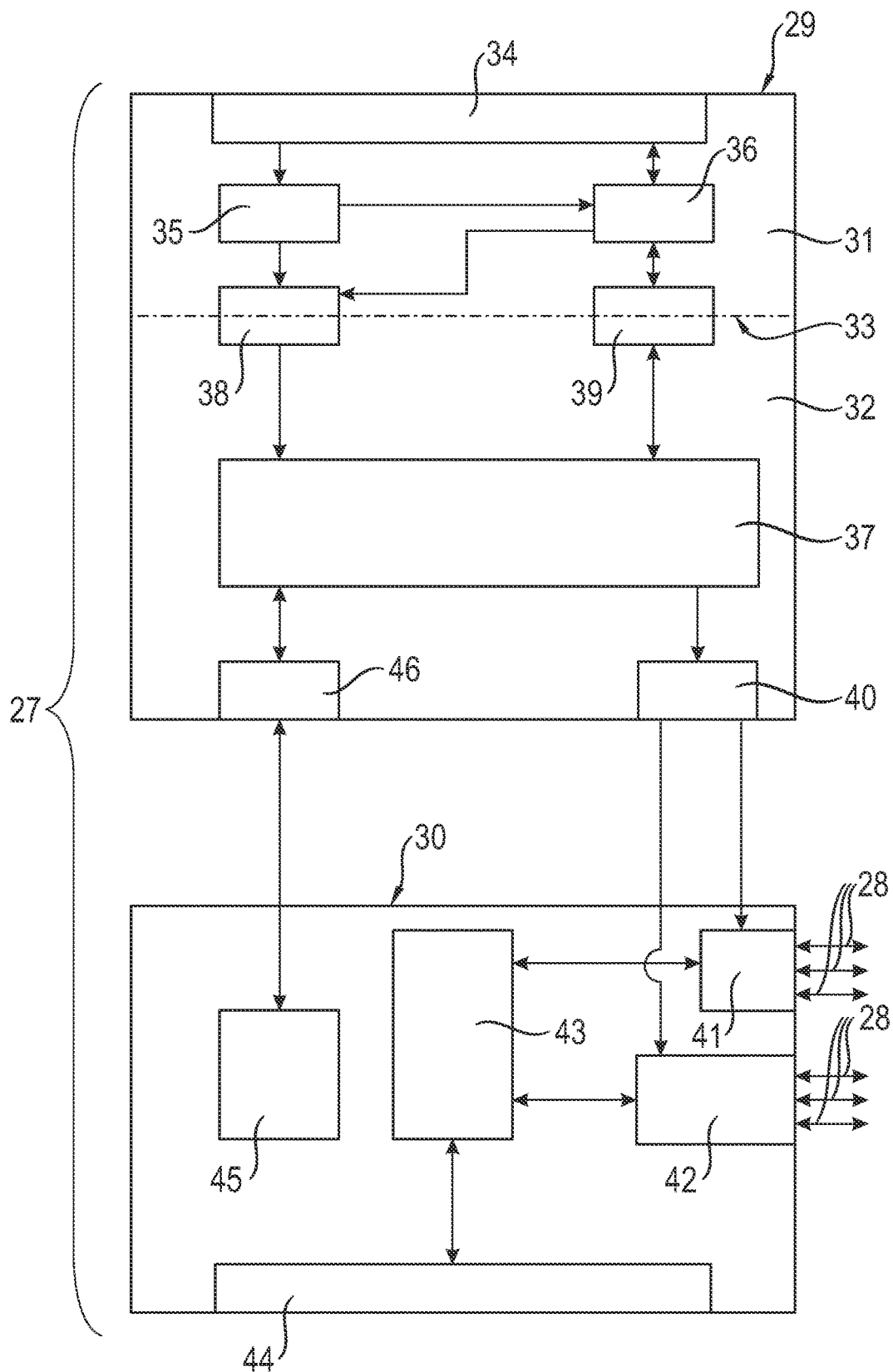
FIG. 2 shows a block diagram of control-side assemblies of the damping arrangement of FIG. 1 according to aspects of the invention.

As can be seen in FIG. 1, a common control device 27 which is electrically coupled to the electric motors 17 interacts with both motor-pump units 18. FIGS. 1 and 2 show phase lines 28 which extend between the common control device 27 and the electric motors 17 of the damping system 10a, 10b of the damping arrangement.

The control device 27 of the damping arrangement according to aspects of the invention has a plurality of electronic assemblies which are distributed on different printed circuit boards. First electronic assemblies are thus arranged on a first printed circuit board 29 and second electronic assemblies are thus arranged on a second printed circuit board 30.

In this case, the first printed circuit board 29 has a low-voltage range 31 with low-voltage assemblies and a high-voltage range 32 with high-voltage assemblies, wherein the high-voltage range 32 and the low-voltage range 31 are galvanically isolated by means of a galvanic isolation 33 which has isolating assemblies. The galvanic isolation preferably provides isolation of up to 2500 volts.

The second printed circuit board 30 carries only high-voltage assemblies and is electrically connected to the high-voltage range 32 of the first printed circuit board 29.

The low-voltage assemblies of the low-voltage range 31 of the first printed circuit board 29 of the control device 27 include a low-voltage connection 34, a low-voltage voltage distributor 35 and a signal converter 36. A low-voltage connector which provides a low voltage at the low-voltage voltage distributor 35 can be connected to the low-voltage connection 34. The signal converter 36 is used to convert analogue CAN signals into digital CAN signals.

A CPU 37 is a central component of the high-voltage assemblies of the high-voltage range 32 of the first printed circuit board 29. A transformer assembly 38 and a digital isolator 39 are connected as isolating assemblies between the CPU 37 and the low-voltage range 31 of the first printed circuit board 29. This means that the CPU 37 can be galvanically decoupled from the low-voltage range 31 both on the voltage side and on the signal side.

In addition to the CPU 37, the high-voltage assemblies of the first printed circuit board 29 include a control logic system 40 for DC/AC converters 41, 42 which are used to supply voltage and/or current to the electric machines 17. The DC/AC converters 41, 42 convert a DC voltage into an AC voltage and are high-voltage assemblies of the second printed circuit board 30.

The DC/AC converters 41, 42 of the second printed circuit board 30 can be controlled by the control logic system 40 of the first printed circuit board 29 and coupled to a DC link capacitor 43 which is part of the second printed circuit board 30. The DC link capacitor 43 is connected between a high-voltage connection 44 and the DC/AC converters 41, 42.

Additional high-voltage assemblies of the second printed circuit board 30 may be sensors 45. FIG. 2 shows an example of a sensor 45 which is coupled to the first printed circuit board 29 via a sensor interface 46 thereof in order to provide measured values via the sensor interface 46 of the CPU 37.

Since the CPU 37 is installed in the high-voltage range 32 of the first printed circuit board 29 and is part thereof, the galvanic isolation with respect to the low-voltage range 31 can be of simple design. Only galvanic isolation with respect to the low-voltage voltage distributor 35 and the signal converter 36 is required. All other assemblies with which the CPU 37 must exchange data are high-voltage assemblies which are installed either in the high-voltage range 32 of the first printed circuit board 29 or on the second printed circuit board 30. With a simple design, the electric motors 27 can be actuated reliably.

The operating voltage of the low-voltage assemblies is less than 50 volts, preferably less than 25 volts, particularly preferably less than 15 volts. The operating voltage of the high-voltage assemblies is greater than 200 V, preferably greater than 400 volts, particularly preferably greater than 500 volts.

In the case of a motor vehicle with several axles, each axle is assigned a damping arrangement.

What is claimed is:

1. A damping arrangement for an axle of an active chassis of a motor vehicle, wherein damping systems of the damping arrangement interact with respective wheels of the axle, wherein each of the damping systems comprises:
    (a) a damper comprising a double-acting hydraulic cylinder and a piston, wherein the damper is configured to be coupled to a wheel suspension system of the respective wheel,
    (b) a hydraulic pump and an electric motor for driving the respective hydraulic pump, wherein the hydraulic pump is a reversing pump which is configured to be driven by the electric motor in different directions of rotation in order to provide different delivery directions, and
    (c) a hydraulic unit which comprises a hydraulic reservoir and valves, wherein the hydraulic pump and the hydraulic unit of the respective damping system interact with hydraulic chambers of the hydraulic cylinder of the respective damping system in such a manner that a movement of the piston in a first operating direction or in a second operating direction can be provided depending on the delivery direction of the hydraulic pump,
    wherein the electric motors of both damping systems are connected to a common control device and are configured to be actuated by the common control device,
    wherein the common control device has electronic assemblies which are distributed on different printed circuit boards in such a way that:
        (i) a first printed circuit board of the common control device has a low-voltage range with low-voltage assemblies and a high-voltage range with high-voltage assemblies which is galvanically isolated from the low-voltage range by isolating assemblies, wherein a CPU is included in the high-voltage assemblies of the first printed circuit board, and
        (ii) a second printed circuit board of the common control device has exclusively high-voltage assemblies, wherein the second printed circuit board is electrically connected to the high-voltage range of the first printed circuit board.

2. The damping arrangement according to claim 1, wherein the low-voltage assemblies of the low-voltage range of the first printed circuit board have a low-voltage connection, a low-voltage voltage distributor and a signal converter.

3. The damping arrangement according to claim 1, wherein the isolating assemblies of the galvanic isolation of the first printed circuit board have a transformer assembly and a digital isolator.

4. The damping arrangement according to claim 1, wherein, in addition to the CPU, the high-voltage assemblies of the high-voltage range of the first printed circuit board have a control logic system for DC/AC converters.

5. The damping arrangement according to claim 4, wherein the DC/AC converters which are configured to provide an electric current for the electric motors are high-voltage assemblies of the second printed circuit board.

6. The damping arrangement according to claim 5, wherein the second printed circuit board has a high-voltage connection and a DC link capacitor connected between the high-voltage connection and the DC/AC converters as additional high-voltage assemblies.

7. The damping arrangement according to claim 5, wherein the second printed circuit board has sensors as additional high-voltage assemblies.

8. The damping arrangement according to claim 1, wherein the operating voltage of the low-voltage assemblies is less than 50 volts and the operating voltage of the high-voltage assemblies is greater than 200 volts.

9. The damping arrangement according to claim 1, wherein the operating voltage of the low-voltage assemblies is less than 15 volts and the operating voltage of the high-voltage assemblies is greater than 500 volts.

10. A motor vehicle having several axles, wherein each axle is assigned one of the damping arrangements according to claim 1.

* * * * *